United States Patent [19]

Mellgren

[11] Patent Number: 4,468,917
[45] Date of Patent: Sep. 4, 1984

[54] BUSH CLEANING APPARATUS

[75] Inventor: Per-Gustaf Mellgren, Beaconsfield, Canada

[73] Assignee: Forest Engineering Research Institute of Canada, Pointe Claire, Canada

[21] Appl. No.: 419,162

[22] Filed: Sep. 17, 1982

[51] Int. Cl.³ .............................................. A01D 35/26
[52] U.S. Cl. ..................................... 56/15.2; 56/15.5; 56/15.9
[58] Field of Search .................. 56/15.5, 15.9, 13.5, 56/15.1, 15.2, 15.7, 15.8

[56] References Cited

U.S. PATENT DOCUMENTS

| | | | |
|---|---|---|---|
| 1,045,627 | 11/1912 | Stanhus | 56/15.5 |
| 1,335,266 | 3/1920 | Zander | 56/15.9 |
| 2,560,641 | 7/1951 | Goodlet | 56/15.5 |
| 3,665,686 | 5/1972 | Duncan | 56/15.9 |

FOREIGN PATENT DOCUMENTS

| | | | |
|---|---|---|---|
| 511809 | 6/1952 | Belgium | 56/15.5 |
| 59531 | 1/1947 | Netherlands | 56/15.5 |

*Primary Examiner*—Jay N. Eskovitz
*Attorney, Agent, or Firm*—Charles E. Brown

[57] ABSTRACT

An apparatus for cleaning bush. The apparatus has a frame with a circular saw mounted at the front end and power means, for use in operating the saw, mounted at the rear end. Pivot means on the frame are used to pivotally mount the apparatus on a bush vehicle. The vehicle is driven in bush and the saw is operated to cut down bush and small trees. The vehicle operator can both move the circular saw from side to side, and tilt the frame, to raise or lower the saw with one hand.

11 Claims, 2 Drawing Figures

BUSH CLEANING APPARATUS

This invention is directed toward a bush cleaning apparatus.

The invention is also directed toward a bush cleaning machine employing the bush cleaning apparatus of the present invention mounted on a bush vehicle.

In reforestation areas, stands of new trees must be cleared of weed trees and thinned out to provide maximum growth. The best or "plus" trees are selected in the stand, and the other trees are cut down to provide the desired spacing between the selected trees. The weeding and thinning is usually done by a person carrying a portable brush saw. The machine has a small circular saw at one end of a support and a small gasoline engine at its other end. The operator walks with the machine, swinging the saw to cut down small trees. The portable sawing machine is very heavy and cumbersome however and thus not very productive, since frequent rests are necessary.

It is known to mount circular saws for cutting trees on skids or tractors so that the saws can be more easily transported. However complicated hydraulic means are usually very expensive. It is also known to employ circular saws on skids or tractors which saws can be manually moved to a position to cut down trees. Such machines are shown in U.S. Pat. Nos. 2,224,757 or 2,619,129 by way of example. The machine in U.S. Pat. No. 2,224,757 is not very portable however and requires two hands to operate it. In addition, the saw on the machine has a limited range of movement and thus the machine must be moved frequently. The saw on the machine in U.S. Pat. No. 2,619,129 also has a limited range of movement.

It is the purpose of the present invention to provide a simple and easily operated bush cleaning apparatus. It is a further purpose of the present invention to provide a bush cleaning apparatus with a saw that has a wide range of movement. It is another purpose of the present invention to provide a bush cleaning machine incorporating the bush cleaning apparatus of the present invention which machine is simple in construction, and fast and easy to operate.

The bush cleaning apparatus of the present invention uses a lightweight frame which has a circular saw at one end and power means for operating the saw at its other end. The frame has a pair of pivots intermediate its ends for use in mounting the saw on a bush vehicle. The circular saw is mounted on the frame so it can move from side to side to cut trees in a wide strip. Operator means are provided on the frame for moving the saw from side to side.

The pivot mounting of the frame allows the saw to move up and down as well. Preferably the apparatus is so balanced about the pivot means that in an at-rest position, the frame is tilted with its front end up. Operator means are provided on the frame to move the front end of the frame downwardly to cut a tree off close to the ground. Preferably the operator means for moving the front end of the frame downwardly form part of the operator means for moving the saw from side to side.

The operator means for moving the saw from side to side can comprise a cable and pulley system operated by a control wheel mounted on the frame. Preferably, the control wheel is mounted on the frame forwardly of the pivot means. Operator pressure applied downwardly on the control wheel will tilt the front end of the frame down to position the saw close to the ground. At the sawe time, the control wheel can be rotated to swing the saw to one side or the other. From the above it will be seen that the saw can be easily and simply moved, in two directions simultaneously using a single, simple control which can be operated by one hand.

The apparatus is preferably mounted on a small, simple all-terrain vehicle having a body supported by ground-engaging means such as wheels. An operator's seat is located on the body in the central area of the body. The apparatus is mounted by the pivot means to brackets on the body on each side of the seat. The control wheel on the frame is positioned to one side of the seat, well within the operator's reach. The operator can drive the vehicle with one head while controlling the position of the saw with the other.

The machine is compact so that it can pass between rows of trees eight feet, or even less, apart. The saw is mounted on the frame so that it can swing well past the rows so as to easily cut trees between selected trees in each row. The apparatus is balanced on the vehicle in a manner that there are no, or at least very little, vertical forces acting on the saw to cause binding and friction between the saw and the tree being cut. The apparatus is also balanced on the vehicle in a manner that it can be easily moved vertically by slight operator pressure. The saw on the apparatus can also be easily moved from side to side, simultaneously with, if desired, the vertical movement of the saw. The balanced mounting of the apparatus on the vehicle, together with a rounded hub on the bottom of the saw, prevents the saw from touching the ground, particularly when the vehicle travels over rough ground and/or obstacles.

The invention is particularly directed toward a bush cleaning apparatus having a frame with a circular saw mounted on the front end of the frame, the saw movable from side to side, and power means for use in operating the saw mounted at the rear end of the frame. Pivot means are provided on the frame intermediate its ends for use in pivotally mounting the apparatus on a bush vehicle. Operator means are provided on the frame for swinging the saw from side to side.

The invention is further directed toward a bush cleaning machine having a bush vehicle. The bush vehicle has a body supported by ground engaging means and an operator's seat generally centrally located on the body. The machine also has a bush cleaning apparatus having a frame with a circular saw mounted at the front end of the frame and movable from side to side, and power means for use in operating the saw mounted at the rear end of the frame. Pivot means on the frame, intermediate its ends, are used to pivotally mount the apparatus on the body of the bush vehicle. Operator means are provided on the frame close to the operator's seat for swinging the saw from side to side.

The invention will now be described in detail having reference to the accompanying drawings in which.

Figure 1:
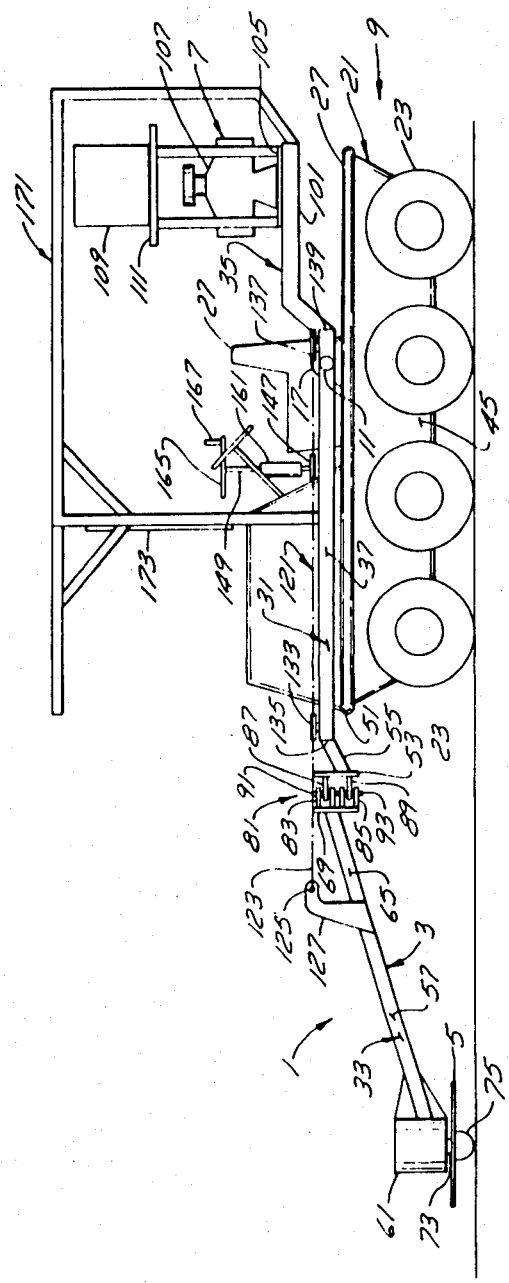
FIG. 1 is a side elevation view of the bush cleaning machine.
Figure 2:
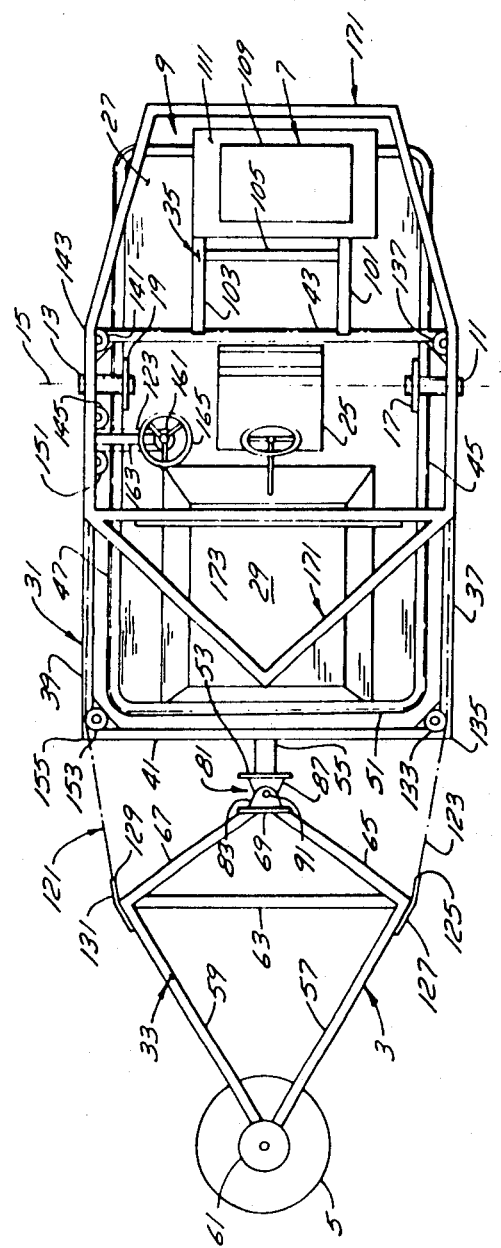
FIG. 2 is a plan view of the machine.

The bush cleaning apparatus 1 of the present invention has a frame 3. The frame 3 is constructed to carry a circular saw 5 at one end and power means 7 at its other end which power means 7 are used to operate the circular saw 5. The apparatus 1 is adapted to be pivotally mounted intermediate its ends to a bush vehicle 9. A pair of pivot pins 11, 13 are mounted on the sides of frame 3 intermediate the ends of frame 3, and aligned on an axis 15 which extends transverse to frame 3. The pivot pins 11, 13 pivotally connect the apparatus 1 to brackets 17, 19 respectively mounted on the sides, and generally centrally, of the bush vehicle 9.

The bush vehicle 9 can be of the type known as a "Bush Swamper", manufactured by Bristol Machine Works Ltd., of Sudbury, Ontario. The vehicle 9 has a body 21 supported by a plurality of low pressure tires 23. An operator's seat 25 is mounted centrally on the top 27 of the body 21 and behind the engine cover 29. The vehicle 9 is quite small having a length under ten feet and a width under five feet. The vehicle 9 is an all-terrain vehicle with a low center of gravity, and with low ground pressure.

In more detail, the frame 3 of the bush cleaning apparatus 1 has a central frame section 31, and front frame section 33 and a rear frame section 35. The central frame section 31 has a two side frame members 37, 39 and front and rear frame members 41, 43 joining the side frmme members 37, 39 together at their ends. The pivot pins 11, 13 are mounted on the side frame members 37, 39 respectively adjacent the rear end frame member 43. The central frame section 31 has a rectangular shape and is mounted, via the pivot pins 11, 13 on the brackets 17, 19 which are mounted on vehicle 9. One bracket 17 is mounted on the body 21 of the vehicle 9 at one side 45 of the body 21 adjacent the rear portion of seat 25. The other bracket 19 is mounted on body 21 at its other side 47 opposite bracket 17. When the central frame section 31 is mounted on brackets 17, 19 the front frame member 41 lies just in front of the front end 51 of the vehicle body 21 and the rear frame member 43 crosses the top 27 of body 21 just behind seat 25. The side frame members 37, 39 lie just outside the sides 45, 47 respectively of body 21. A front support plate 53 is centrally mounted in front of front frame member 41 by a relatively short support member 55 for use in connecting the central frame section 31 to the front frame section 33 as will be described.

The front frame section 33 comprises two front side frame members 57, 59 which extend rearwardly and outwardly from a cylindrical housing 61. A cross-bar 63 joins the end of the front side frame members 57, 59 together. Two rear, side frame members 65, 67 extend rearwardly from the ends of front side frame members 57, 59 respectively and converge at a rear support plate 69. The front side frame members 57, 59 form a relatively narrow "V" shape while the rear side frame members 65, 67 form a relatively shallow "V" shape. The front side frame members 57, 59 and the rear side frame members 65, 67 lie in the same plane along with cross-bar 63.

A motor (not shown) for rotating the circular saw 5 is mounted within housing 61 and a drive shaft 73 projects downwardly from the center of housing 61. Saw 5 is mounted on shaft 73. A rounded skit hub 75 is fastened to the shaft 73 adjacent the bottom surface of saw 5 to prevent the saw 5 from touching the ground.

The front frame section 33 is fastened to the central frame section 31 by vertical pivot means 81. The vertical pivot means 81 can comprise two pair of vertically spaced-apart pivot plates 83, 85 projecting rearwardly from rear support plate 69; two vertically spaced-apart pivot plates 87, 89 projecting forwardly from the front support plate 53; and two vertically aligned pivot pins 91, 93. Pin 91 connects pivot plate 87 to pivot plates 83 and pin 93 connects pivot plate 89 to pivot plates 85. Pivot means 81 allows the saw 5 on front frame section 33 to swing from side-to-side relative to the central frame section 33.

The rear frame section 35 comprises a pair of parallel frame members 101, 103 which extend upwardly and rearwardly from the rear end frame member 43 for a part of their length and then rearwardly for the majority of their length. One or more cross-bars 105 join the frame members 101, 103 together in their rear portion while the front ends of the frame members 101, 103 are fixed to rear frame member 43 of the central frame section.

The power means 7 are mounted on the rear portion of frame members 101, 103 via a platform 105 and comprise a hydraulic pump 107 and a hydraulic fluid supply tank 109 mounted by a stand 111 on platform 105 above pump 107. Hydraulic lines (not shown) run from pump 107 to the saw motor (not shown) in housing 61 through the frame members 101, 43, 37, 41, support 55, and frame members 65, 57 which are all hollow. The hydraulic lines cross in the open between the support plates 53, 69.

Simple means 121 are provided to move the saw 5 from side to-side. The moving means can comprise a cable and pulley system which includes a cable 123 fastened at one end 125 to an upright support 127 on the rear end of front side frame member 57 of front frame section 33 and at its other end 129 to a second upright support 131 on the rear end of the other front side frame member 59. The cable 123 passes from support 127 to a first pulley 133 on the front left hand corner 135 of central frame section 31 and then to a second pulley 137 on the left rear corner 139 of central frame 31. From pulley 137 the cable 123 passes across central frame 31 behind seat 25 to a pulley 141 on the right rear corner 143 of central frame 31, to a pulley 145 on the right side member 39 opposite the front of the seat 25. From pulley 145, the cable 123 passes inwardly a short distance to a control pulley 147 about which the cable 123 is wrapped or fastened. The control pulley 147 is mounted on the bottom end of an upright control shaft 149. From control pulley 147 the cable 123 passes back outwardly to a pulley 151 on the right side member 39, and from pulley 151 to a pulley 153 on the front right hand corner 155 of central frame 31 and then to the second upright support 131. The cable and pulley system could be replaced with a chain and sprocket system.

The upright control shaft 149 is rotatably mounted in an upright tubular support 161 which is connected by a short arm 163 to the inside of the right side member 39. A control wheel 165 having a handle 167 thereon is mounted on the upper end of the control shaft 149. The control wheel 165 is within easy reach of an operator seated on seat 25.

A protective frame 171 is mounted on the frame 3 to protect both the operator seated on seat 25 and the power means 7 from falling trees. In addition, a vertical screen 173 can be mounted on the front of protective frame 171, in front of the operator, to provide further protection for the operator.

The apparatus 1 is designed so that when it is pivotally mounted onto the bush vehicle 9 its center of gravity is just behind the pivot pins 11, 13. Thus the apparatus 1 normally tilts with its front end slightly up and its rear end slightly down. In use, the circular saw 5 can be continually operated. The operator drives the bush vehicle in a line through a stand of trees, cutting out "weed" trees and thinning out the stand to produce a stand having rows of "plus" trees generally equally spaced apart. The operator can steer the bush vehicle with one hand. With the other hand, the operator can turn the control wheel 165 via its handle 167 in either direction to swing the front frame 33, and thus saw 5, via cable 123, to one side or the other to position it to cut selected trees. The front frame 33 is long enough as it swings about pivot pins 91, 93, that the saw 5 can cut trees positioned a few feet to either side of the vehicle.

While operating the control wheel 165 to swing the saw from side to side, the operator can also move the saw 5 down vertically to a desired cutting position by pressing down on control wheel 165 to thereby tilt the frame 3 down about pivot pins 11, 13. The apparatus 1 is balanced in a manner that very little downward pressure on control wheel 165 is required to tilt the apparatus 1 downwardly. The skid hub 75 on the bottom of saw 5 prevents damage to the saw if too much downward pressure is applied to the control wheel 165. A release of downward pressure on the control wheel 165 allows the frame 3 to tilt upwardly at its front end on moving to its normal rest position, thereby elevating saw 5 until the next tree is to be cut. The apparatus 1 generally maintains its rest position even when the vehicle travels over very uneven ground due it its inertial forces about pivot pins 11, 13.

While the apparatus 1 has been shown and described with a circular saw 5 that is mounted on the frame 3 in a manner to swing from side-to-side about pivot means 81, the apparatus can also employ a circular saw that is mounted on the front of the frame 3 in a manner to move laterally on the frame 3 from side-to-side. Suitable operator means would be provided to move the saw across the front of the frame from side-to-side instead of having to move a portion of the frame to move the saw. The vehicle can be manoeuvered to position the saw to cut down trees between selected trees, in a row, as well as cutting down trees between rows.

I claim:

1. A bush cleaning apparatus having a frame with a front section, a central section and a rear section; the front frame section carrying a circular saw; the rear frame section carrying self-contained power means for operating the saw; first pivot means on the central frame section for use in pivotally mounting the apparatus onto a bush vehicle so that the frame can tilt relative to the vehicle about a generally horizontal axis to move the circular saw up or down; second pivot means connecting the front frame section to the central frame section for allowing the circular saw to swing about a generally upright axis; and first operator means on the frame for moving the front frame section about the second pivot means to swing the circular saw from side to side.

2. An apparatus as claimed in claim 1 including second operator means on the frame for use in tilting the apparatus about the first pivot means, when it is mounted on a bush vehicle.

3. An apparatus as claimed in claim 2 wherein the second operator means forms part of the first operator means.

4. An apparatus as claimed in claim 1 wherein the circular saw is mounted for rotation on the front end of the front frame section about an axis parallel to the second pivot means.

5. An apparatus as claimed in claim 3, wherein the operator means on the frame for swinging the saw from side to side comprises a mechanical linkage system connecting the front frame section on either side of the second pivot means to a control wheel rotatably mounted on the central frame section.

6. An apparatus as claimed in claim 5 wherein the control wheel is mounted on the central frame forwardly of the first pivot means so that downward operator pressure on the control wheel will move the front end of the frame downwardly about the first pivot means.

7. An apparatus as claimed in claim 1 wherein the first pivot means on the frame are located just in front of the center of gravity of the apparatus so that the front end of the frame will normally pivot upwardly about the first pivot means.

8. A bush cleaning machine comprising: a bush vehicle, the bush vehicle having a body supported by ground support means and an operator's seat generally centrally located on the body; a bush cleaning apparatus having a frame with a front section, a central section and a rear section; the front frame section carrying a circular saw; the rear frame section carrying self-contained power means for operating the saw; first pivot means on the central frame section pivotally mounting the apparatus on the bush vehicle so that the frame can tilt relative to the vehicle and move the circular saw up or down; second pivot means connecting the front frame section to the central frame section for allowing the circular saw to swing about a generally upright axis; and first operator means on the frame located adjacent the operator's seat for moving the front frame section about the second pivot means to swing the circular saw from side to side.

9. A machine as claimed in claim 8 including second operator means on the frame adjacent the operator's seat for use in tilting the apparatus about the first pivot means.

10. A machine as claimed in claim 9 wherein the second operator means forms part of the first operator means.

11. A machine as clained in claim 8 wherein the first pivot means are located just in front of the center of gravity of the apparatus so that the front end of the frame will normally pivot upwardly about the first pivot means relative to the vehicle.

* * * * *